US008180686B2

(12) United States Patent
Ryu et al.

(10) Patent No.: US 8,180,686 B2
(45) Date of Patent: May 15, 2012

(54) MULTI-STEP AUTHENTICATION-BASED ELECTRONIC PAYMENT METHOD USING MOBILE TERMINAL

(75) Inventors: Gung-seon Ryu, Seoul (KR); Jung-wook Shin, Seoul (KR); Su-jin Lim, Gyeonggi-do (KR)

(73) Assignee: Danal Co., Ltd., Gyeonggi-Do (KR)

( * ) Notice: Subject to any disclaimer, the term of this patent is extended or adjusted under 35 U.S.C. 154(b) by 441 days.

(21) Appl. No.: 12/614,227

(22) Filed: Nov. 6, 2009

(65) Prior Publication Data

US 2011/0082767 A1 Apr. 7, 2011

(30) Foreign Application Priority Data

Oct. 7, 2009 (KR) .................. 10-2009-0095201

(51) Int. Cl.
*G06Q 30/00* (2006.01)
(52) U.S. Cl. ............... 705/26.35; 705/26.81; 705/26.82
(58) Field of Classification Search ............ 705/26–27.2
See application file for complete search history.

(56) References Cited

U.S. PATENT DOCUMENTS

2002/0143634 A1* 10/2002 Kumar et al. ............... 705/18
2009/0292619 A1* 11/2009 Kagan et al. ............... 705/26

OTHER PUBLICATIONS

Aloul; "Two Factor Authentication Using Mobile Phones;" May 10-13, 2009, IEEE, Piscataway, NJ, USA; pp. 641-644.*

* cited by examiner

*Primary Examiner* — Adam Levine
(74) *Attorney, Agent, or Firm* — Locke Lord LLP

(57) ABSTRACT

Disclosed herein is a multi-step authentication-based electronic payment method using a mobile terminal. Order request information of a product is sequentially transmitted to an affiliated store server and a PG company server, and the product and a relevant affiliated store are verified. A mobile communication company server primarily authenticates the user, and the PG company server generates an OTP. The OTP is transmitted to allow the PG company server to secondarily authenticate the user using the OTP. The affiliated store server requests the PG company server to confirm information about a payment for the product and information about authentication of the user, and the PG company server confirms payment and authentication information. The affiliated store server requests the PG company server to process payment for the product, the PG company server requests the mobile communication company server to process payment, and the mobile communication company server processes requested payment.

21 Claims, 6 Drawing Sheets

MULTI-STEP AUTHENTICATION-BASED ELECTRONIC PAYMENT METHOD USING MOBILE TERMINAL

CROSS REFERENCE TO RELATED APPLICATIONS

This patent application claims priority to Korean Patent Application No. 10-2009-095201, filed Oct. 7, 2009, and incorporated herein by reference in its entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The present invention relates, in general, to an electronic payment method, and, more particularly, to a multi-step authentication-based electronic payment method using a mobile terminal, which not only can realize the security and convenience of making electronic payments through multi-step authentication, composed of authentication based on a phone number and a personal identification code and authentication based on a One Time Password (OTP), using the mobile terminal of a user, but also can improve the security of transactions and the convenience of the user by utilizing both a limit management system capable of providing a payment service in line with the credit limit of the user and a risk management system capable of preventing illegal transactions.

2. Description of the Related Art

Interest in electronic payment methods using portable mobile devices including mobile phones (hereinafter referred to as 'mobile terminals') has increased gradually. Recently, the fields of use of electronic payments have extended to making payments based on the transactions of various products and a variety of types of services as well as payments for Internet content.

As conventional electronic payment methods, a payment based on a credit card is configured to use a method of allowing a user to directly enter a credit card number and a password, thus realizing convenient payments. However, this method is disadvantageous in that, when such a credit card number and password are accidentally leaked to a third party having a malicious intention, one is made to worry about the security of transactions, indicating that a serious loss of personal property may follow. Even in the case where a payment method such as making an online money transfer is used, it is inconvenient to use such a payment method because a user expresses an intention to purchase a relevant product and thereafter personally visits a bank or transfer money corresponding to the purchasing price to the account of a seller through telebanking or Internet banking.

Due thereto, recently, research into a new electronic payment method capable of not only improving the security of transaction information of each person but also satisfying both the security and convenience of transactions using mobile phones has been actively conducted, with the recent tendency for mobile phone to become popular.

The inventions disclosed and taught herein are directed to an improved system and method for authenticating electronic payments using a mobile terminal.

BRIEF SUMMARY OF THE INVENTION

Accordingly, an object of the present invention is to provide a multi-step authentication-based electronic payment method using a mobile terminal, which can achieve convenient electronic payments by utilizing the mobile terminal of a user, which has become popular, for making electronic payments, and can improve the security of making electronic payments by implementing the authentication of the user in multiple steps.

More specifically, the invention may comprise a multi-step authentication-based electronic payment method using a mobile terminal, an affiliated store server for selling products over a communication network, a Payment Gateway (PG) company server and a mobile communication company server. In some embodiments, the method may comprise a purchase request verification step of sequentially transmitting order request information of a product requested to be purchased by a user computer to the affiliated store server and the PG company server, and verifying the product and a relevant affiliated store, based on the order request information received at the PG company server. In some embodiments, the method may comprise a user primary authentication performance and secondary authentication preparation step of sequentially transmitting information about a request for primary authentication of the user, received from the user computer, to the affiliated store server, the PG company server and the mobile communication company server, allowing the mobile communication company server to primarily authenticate the user, based on the primary authentication request information, and send a response indicating whether the primary authentication has been performed to the PG company server, allowing the PG company server, which verifies the primary authentication of the user through the mobile communication company server, to generate a One Time Password (OTP) for secondary authentication of the user and request the mobile communication company server to send a Short Message Service (SMS) message to transmit the generated OTP to the mobile terminal of the user, and allowing the mobile communication company server to transmit the OTP generated by the PG company server to the mobile terminal of the user through the SMS message. In some embodiments, the method may comprise a user secondary authentication step of inputting the OTP received through the SMS message to the user computer, and transmitting the OTP to the PG company server, thus allowing the PG company server to secondarily authenticate the user using the OTP. In some embodiments, the method may comprise a payment confirmation step of, after the primary and second authentication of the user have been completed, allowing the affiliated store server to request the PG company server to confirm information about a payment for the purchase-requested product and information about authentication of the user, and allowing the PG company server to confirm the information about the payment and authentication. In some embodiments, the method may comprise a step of, after the payment confirmation step, allowing the affiliated store server to request the PG company server to process the payment for the purchase-requested product, allowing the PG company server to request the mobile communication company server to process the payment, and allowing the mobile communication company server to process the requested payment, and to transmit determination of whether the payment has successfully processed to the mobile terminal of the user through an SMS message. In some embodiments, the method may also include limit determination step and/or a normal transaction verification step.

Alternatively, the invention may comprise a multi-step authentication-based electronic payment method using a mobile terminal, an affiliated store server for selling products over a communication network, a Payment Gateway (PG) company server and a mobile communication company server. In some embodiments, the method may comprise sequentially transmitting order request information of a product requested to be purchased by a user computer to the affiliated store server and the PG company server, and verifying the product and a relevant affiliated store, based on the order request information received at the PG company server. In some embodiments, the method may comprise sequentially transmitting information about a request for primary authentication of the user, received from the user computer, to the affiliated store server, the PG company server and the mobile communication company server, primarily authenticating the user, at the mobile communication company server, based on the primary authentication request information, and sending a response indicating whether the primary authentication has been performed from the mobile communication company server to the PG company server, generating a One Time Password (OTP), at the PG company server, for secondary authentication of the user, the PG company server also requesting the mobile communication company server to send a Short Message Service (SMS) message containing the OTP to the mobile terminal of the user, and transmitting the OTP from the mobile communication company server to the mobile terminal of the user through the SMS message. In some embodiments, the method may comprise inputting the OTP received through the SMS message to the user computer, and transmitting the OTP to the PG company server, thus allowing the PG company server to secondarily authenticate the user using the OTP. In some embodiments, the method may comprise requesting the PG company server to confirm information about a payment for the purchase-requested product and information about authentication of the user, and the PG company server to confirming the information about the payment and authentication. In some embodiments, the method may comprise the affiliated store server requesting the PG company server to process the payment for the purchase-requested product, the PG company server requesting the mobile communication company server to process the payment, and the mobile communication company server processing the requested payment, and transmitting determination of whether the payment has successfully processed to the mobile terminal of the user through an SMS message. In some embodiments, the method may also include limit determination step and/or a normal transaction verification step.

Another object of the present invention is to provide a multi-step authentication-based electronic payment method using a mobile terminal, which can improve the security of transactions and the convenience of a user by introducing both a Limit Management System (LMS) capable of providing a payment service in line with the credit limit of the user and a Risk Management System (RMS) capable of preventing illegal transactions.

In order to accomplish the above objects, the present invention may provide a multi-step authentication-based electronic payment method using a mobile terminal, the method being configured based on a structure in which an affiliated store server for selling products over a communication network, a Payment Gateway (PG) company server and a mobile communication company server are operated in conjunction with each other, the method providing a service for making electronic payments for a product requested to be purchased by a user from the affiliated store server, comprising (a) a purchase request verification step of sequentially transmitting order request information of a product requested to be purchased by a user computer to the affiliated store server and the PG company server, and verifying the product and a relevant affiliated store, based on the order request information received from the PG company server; (b) a user primary authentication performance and secondary authentication preparation step of sequentially transmitting information about a request for primary authentication of the user, received from the user computer, to the affiliated store server, the PG company server and the mobile communication company server, allowing the mobile communication company server to primarily authenticate the user, based on the primary authentication request information, and send a response indicating whether the primary authentication has been performed to the PG company server, allowing the PG company server, which verifies the primary authentication of the user through the mobile communication company server, to generate a One Time Password (OTP) for secondary authentication of the user and request the mobile communication company server to send a Short Message Service (SMS) message for the OTP so as to transmit the generated OTP to the mobile terminal of the user, and allowing the mobile communication company server to transmit the OTP requested by the PG company server to the mobile terminal of the user through the SMS message; (c) a user secondary authentication step of inputting the OTP received through the SMS message to the user computer, and transmitting the OTP to the PG company server, thus allowing the PG company server to secondarily authenticate the user using the OTP; (d) a payment confirmation step of, after the primary and second authentication of the user have been completed, allowing the affiliated store server to request the PG company server to confirm information about a payment for the purchase-requested product and information about authentication of the user, and allowing the PG company server to confirm the information about the payment and authentication; and (e) a step of, after the payment confirmation step, allowing the affiliated store server to request the PG company server to process the payment for the purchase-requested product, allowing the PG company server to request the mobile communication company server to process the payment, and allowing the mobile communication company server to process the requested payment, and to transmit determination of whether the payment has successfully processed to the mobile terminal of the user through an SMS message.

In some embodiments, step (b) comprises, after the user primary authentication request information received from the user computer is transmitted from the affiliated store server to the PG company server when the user primary authentication request information is sequentially transmitted to the affiliated store server, the PG company server and the mobile communication company server, the steps of (b-1) a limit determination request step of allowing the PG company server to request a Limit Management System (LMS) in which the user sets his or her credit limit in advance to determine the credit limit of the user; (b-2) a limit determination step of the LMS determining the credit limit of the user requested by the PG company server; and (b-3) after determining the credit limit of the user, the LMS transmitting results of the determination of the credit limit of the user to the PG company server.

In some embodiments, step (b-2) comprises the steps of (b-2-1) receiving limit management information of the user including a phone number, a personal identifier and a transaction amount; (b-2-2) determining using the received limit management information whether an amount of money to be paid for the product requested to be ordered by the user exceeds the credit limit set by the user; (b-2-3) if it is determined that the amount of money to be paid exceeds the credit limit, denying the transaction by the user, whereas if it is determined that the amount of money to be paid does not exceed the credit limit, permitting the transaction by the user; and (b-2-4) in respective cases where the transaction by the user is permitted and denied, generating and accumulating new information about transaction details and residual limit of the user using collected transaction information of the user, which includes limit rules, an application period, an amount of money corresponding to the residual limit, an amount of money used, and limit setting details, and feeding the new information back to step (b-2-2) as criteria for determination.

In some embodiments, step (b) comprises, after the user primary authentication request information received from the user computer is transmitted from the affiliated store server to the PG company server when the user primary authentication request information is sequentially transmitted to the affiliated store server, the PG company server and the mobile communication company server, the steps of (b-4) a normal transaction verification requesting step of the PG company server requesting a Risk Management System (RMS) to analyze illegal payment patterns, and request the RMS to verify whether the transaction by the user is a normal transaction; (b-5) a normal transaction verification step of the RMS verifying whether the transaction by the user is a normal transaction, as requested by the PG company server; and (b-6) after the RMS has verified whether the transaction by the user is a normal transaction, transmitting results of the verification of normal transaction by the user to the PG company server.

In some embodiments, step (b-5) comprises the steps of (b-5-1) receiving risk management information, which includes an Internet Protocol (IP) address, identification (ID), an email address, a personal identifier, receipt information, and latest transaction information of the user computer; (b-5-2) determining using the received risk management information whether the user is managed as an improper user, or whether the IP address of the user computer is managed as an improper IP address; (b-5-3) if it is determined that the user is managed as an improper user or that the IP address of the user computer is managed as an improper IP address, denying the transaction by the user, whereas if it is determined that the user is not managed as an improper user or that the IP address of the user computer is not managed as an improper IP address, permitting the transaction by the user; and (b-5-4) in respective cases where the transaction by the user is permitted and denied, analyzing collected risk factors of the user, which includes risk management application rules, illegal transaction data, and risk factor classification information, generating and accumulating new information about rules, and feeding the new information back to step (b-5-2) as criteria for determination.

In some embodiments, (b) comprises, after the user primary authentication request information received from the user computer is transmitted from the affiliated store server to the PG company server when the user primary authentication request information is sequentially transmitted to the affiliated store server, the PG company server and the mobile communication company server, the steps of (b-1) a limit determination request step of allowing the PG company server to request a Limit Management System (LMS) in which the user sets his or her credit limit in advance to determine the credit limit of the user; (b-2) a limit determination step of the LMS determining the credit limit of the user requested by the PG company server; (b-3) after determining the credit limit of the user, the LMS transmitting results of the determination of the credit limit of the user to the PG company server; (b-4) a normal transaction verification requesting step of the PG company server requesting a Risk Management System (RMS) to analyze illegal payment patterns, and request the RMS to verify whether the transaction by the user is a normal transaction; (b-5) a normal transaction verification step of the RMS verifying whether the transaction by the user is a normal transaction, as requested by the PG company server; and (b-6) after the RMS has verified whether the transaction by the user is a normal transaction, transmitting results of the verification of normal transaction by the user to the PG company server.

In some embodiments, step (b-2) comprises (b-2-1) receiving limit management information of the user including a phone number, a personal identifier and a transaction amount; (b-2-2) determining using the received limit management information whether an amount of money to be paid for the product requested to be ordered by the user exceeds the credit limit set by the user; (b-2-3) if it is determined that the amount of money to be paid exceeds the credit limit, denying the transaction by the user, whereas if it is determined that the amount of money to be paid does not exceed the credit limit, permitting the transaction by the user; and (b-2-4) in respective cases where the transaction by the user is permitted and denied, generating and accumulating new information about transaction details and residual limit of the user using collected transaction information of the user, which includes limit rules, an application period, an amount of money corresponding to the residual limit, an amount of money used, and limit setting details, and feeding the new information back to step (b-2-2) as criteria for determination, and step (b-5) comprises the steps of (b-5-1) receiving risk management information, which includes an Internet Protocol (IP) address, identification (ID), an email address, a personal identifier, receipt information, and latest transaction information of the user computer; (b-5-2) determining using the received risk management information whether the user is managed as an improper user, or whether the IP address of the user computer is managed as an improper IP address; (b-5-3) if it is determined that the user is managed as an improper user or that the IP address of the user computer is managed as an improper IP address, denying the transaction by the user, whereas if it is determined that the user is not managed as an improper user or that the IP address of the user computer is not managed as an improper IP address, permitting the transaction by the user; and (b-5-4) in respective cases where the transaction by the user is permitted and denied, analyzing collected risk factors of the user, which includes risk management application rules, illegal transaction data, and risk factor classification information, generating and accumulating new information about rules, and feeding the new information back to step (b-5-2) as criteria for determination.

In some embodiments, the primary authentication request information at step (b) comprises a phone number and a personal identification code of the user.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1:
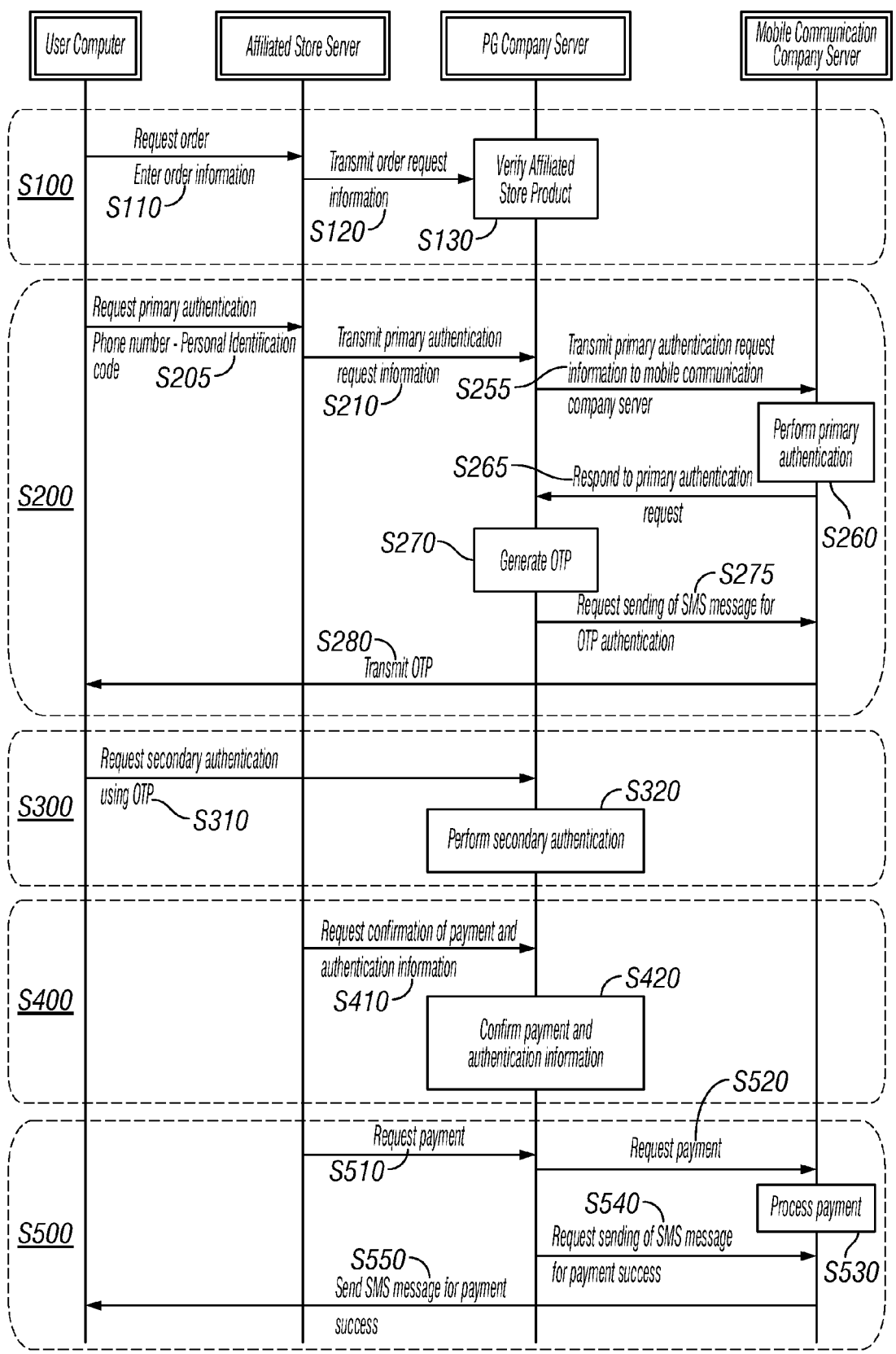
FIG. 1 illustrates a flowchart showing an embodiment of a multi-step authentication-based electronic payment method using a mobile terminal according to the present invention.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Computer programs for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package.

Applicants have created a multi-step authentication-based electronic payment method using a mobile terminal, an affiliated store server for selling products over a communication network, a Payment Gateway (PG) company server and a mobile communication company server. In some embodiments, the method may comprise a purchase request verification step, a user primary authentication performance and secondary authentication preparation step, a user secondary authentication step, a payment confirmation step, and/or an electronic payment processing step. In some embodiments, the method may also include limit determination step and/or a normal transaction verification step.

Unless the terms used in the present specification are especially defined as different terms, all terms used in the specification, including technical and scientific terms, have the same meanings as those of the terms generally understood by those skilled in the art.

In the description of the present invention, the same reference numerals are used throughout the different drawings to designate the same or similar components for easy understanding of the present invention.

Figure 2:
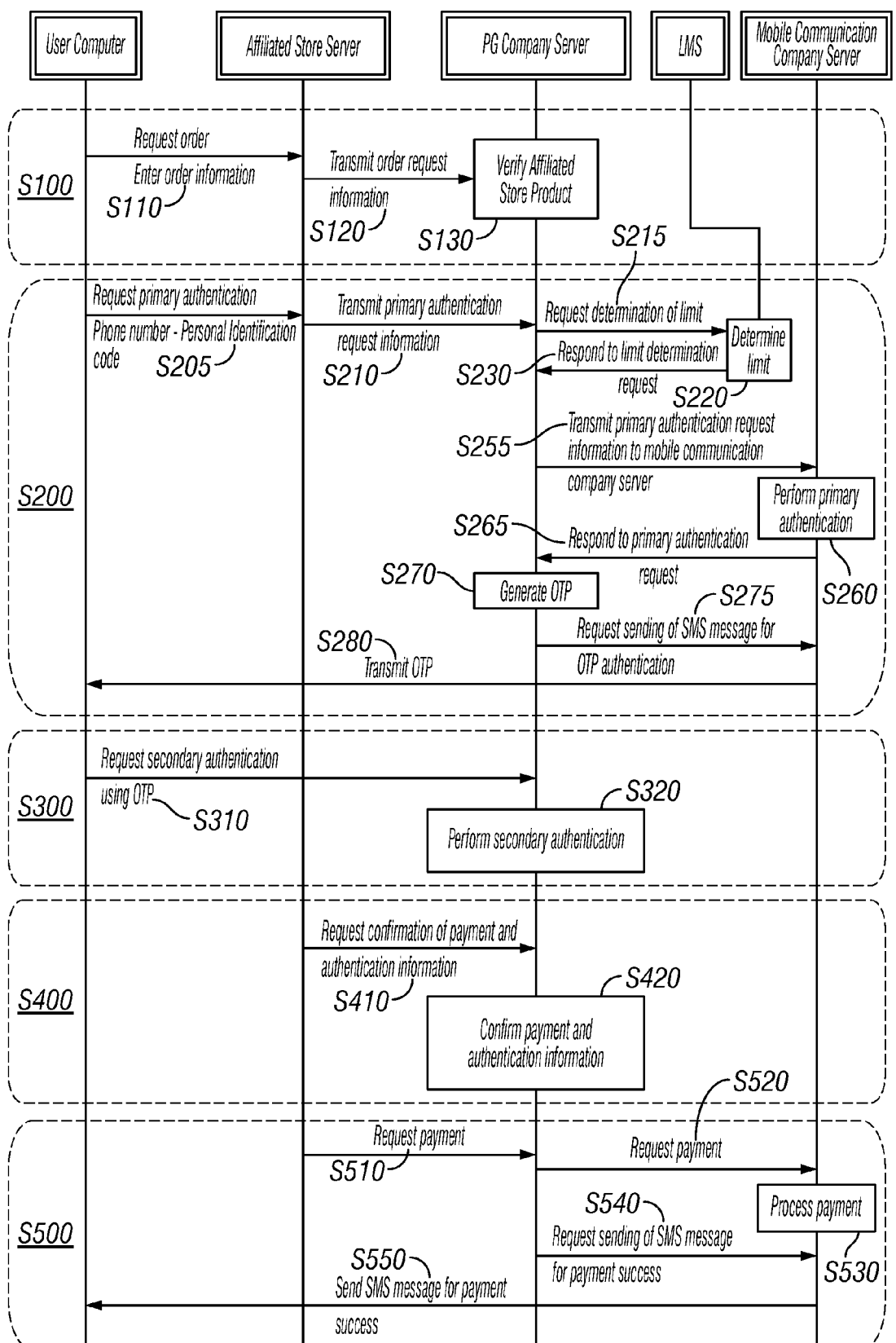
FIG. 2 illustrates a flowchart showing an example in which limit management authentication is applied to the embodiment of the multi-step authentication-based electronic payment method using a mobile terminal according to the present invention.
Figure 3:
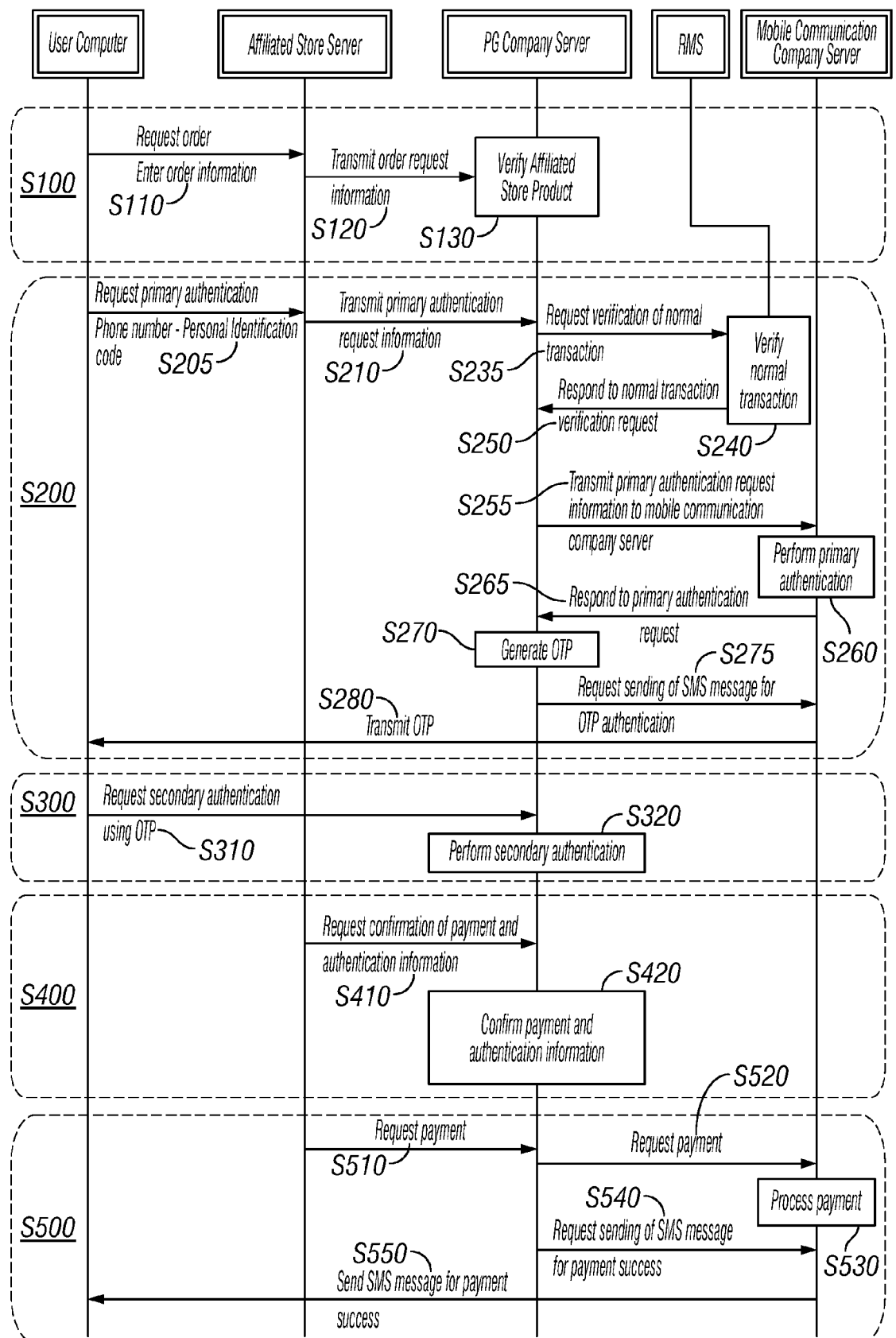
FIG. 3 illustrates a flowchart showing an example in which risk management authentication is applied to the embodiment of the multi-step authentication-based electronic payment method using a mobile terminal according to the present invention.
Figure 4:
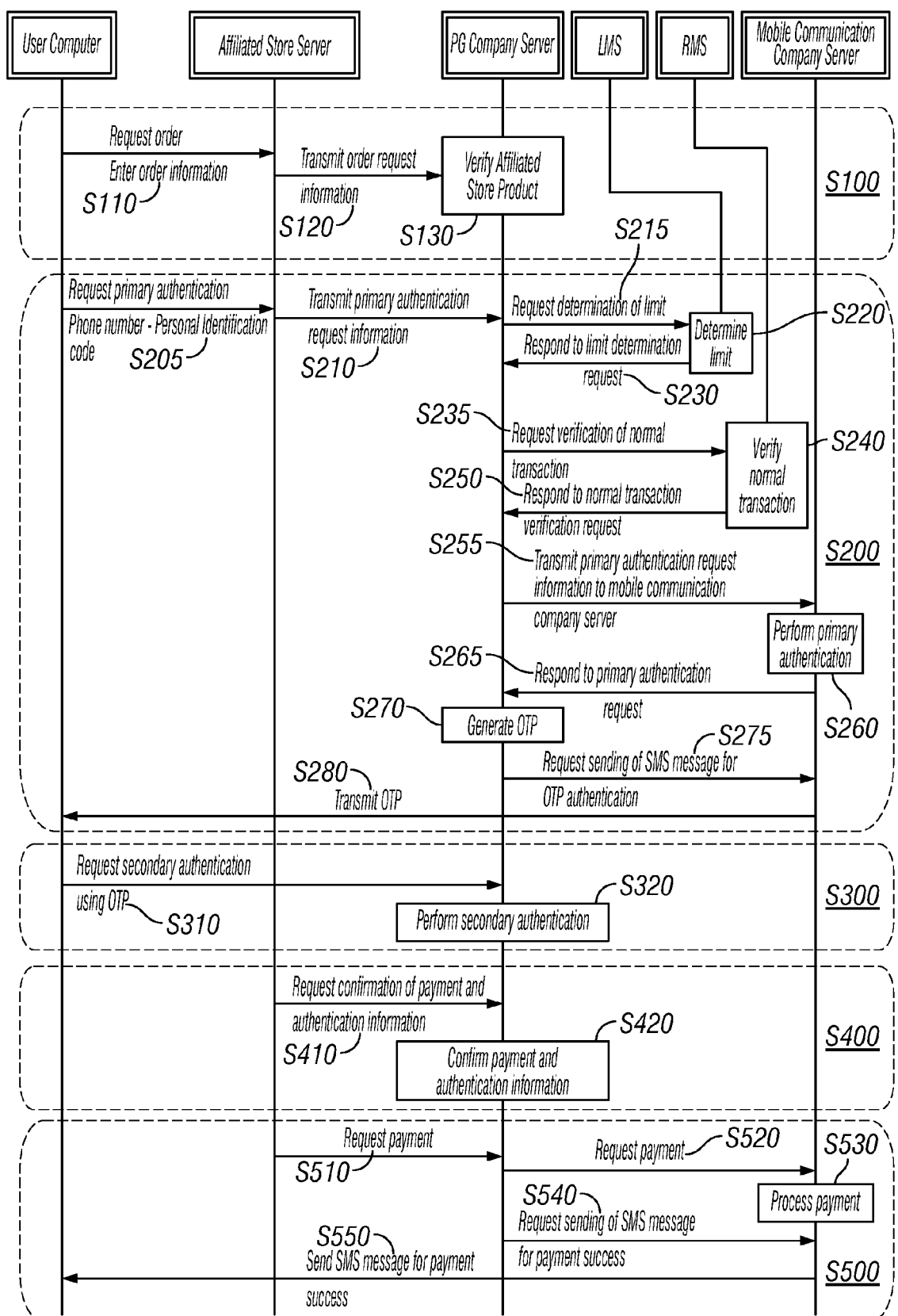
FIG. 4 illustrates a flowchart showing an example in which both limit management authentication and risk management authentication are applied to the embodiment of the multi-step authentication-based electronic payment method using a mobile terminal according to the present invention.
Figure 5:
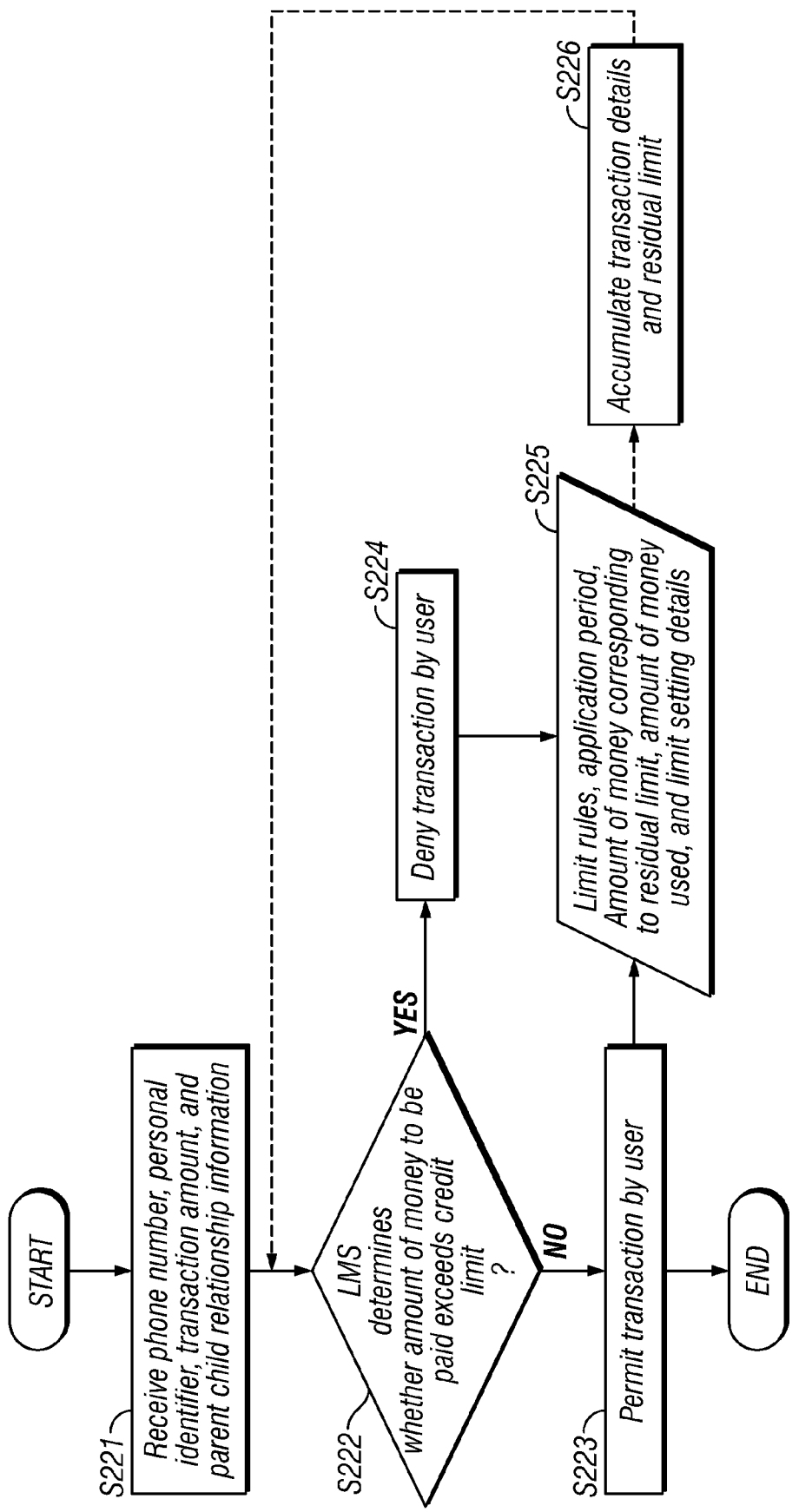
FIG. 5 illustrates a flowchart showing the limit management system of FIGS. 2 and 4.
Figure 6:
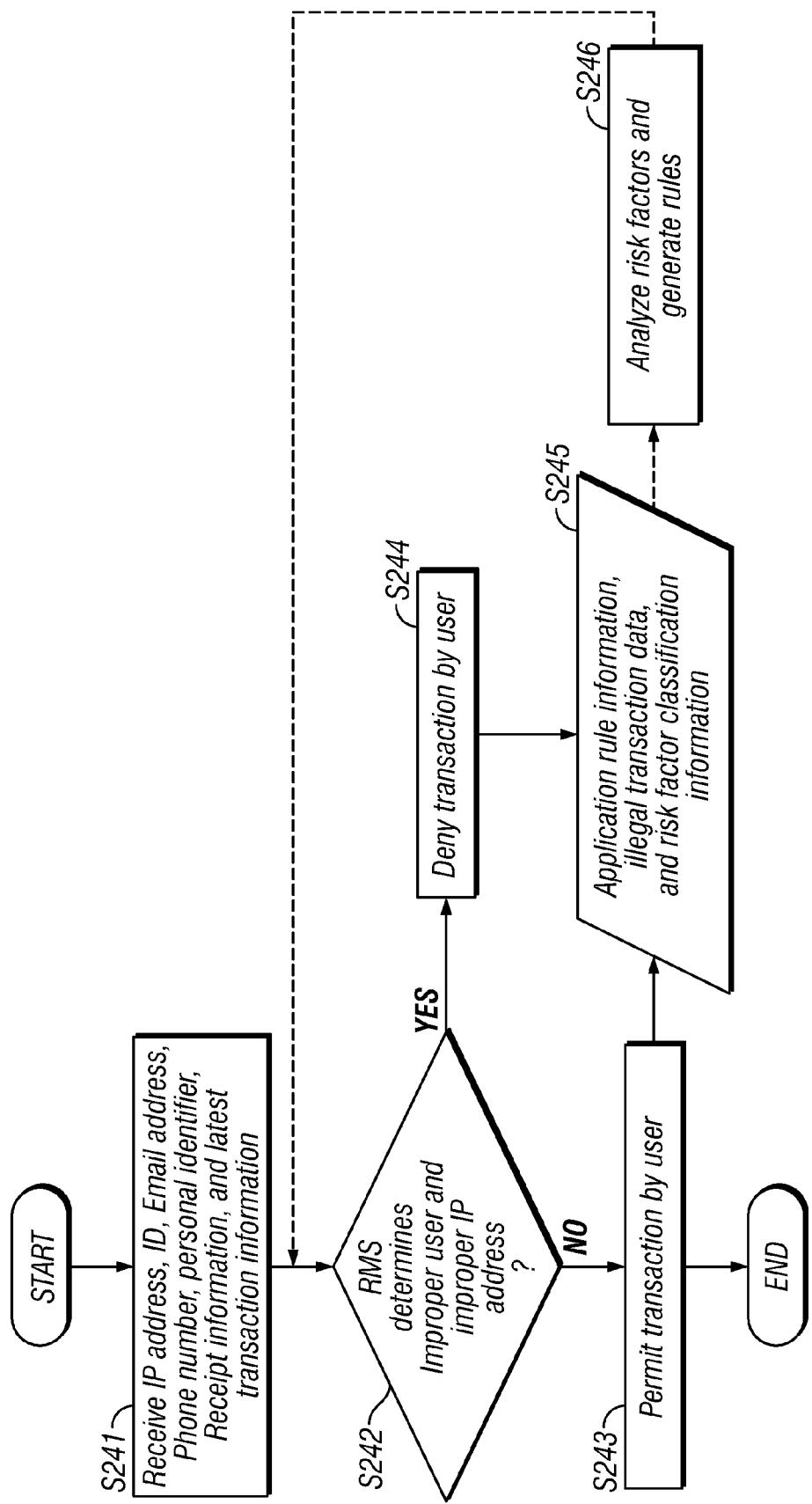
FIG. 6 illustrates a flowchart showing the risk management system of FIGS. 3 and 4.

In the drawings, FIG. 1 is a flowchart showing an embodiment of a multi-step authentication-based electronic payment method using a mobile terminal according to the present invention, FIG. 2 is a flowchart showing an example in which limit management authentication is applied to the embodiment of the multi-step authentication-based electronic payment method using a mobile terminal according to the present invention, FIG. 3 is a flowchart showing an example in which risk management authentication is applied to the embodiment of the multi-step authentication-based electronic payment method using a mobile terminal according to the present invention, FIG. 4 is a flowchart showing an example in which both limit management authentication and risk management authentication are applied to the embodiment of the multi-step authentication-based electronic payment method using a mobile terminal according to the present invention, FIG. 5 is a flowchart showing the limit management system of FIGS. 2 and 4, and FIG. 6 is a flowchart showing the risk management system of FIGS. 3 and 4.

Referring to FIG. 1, the present invention provides a multi-step authentication-based electronic payment method using a mobile terminal, which is configured based on a structure in which an affiliated store server for selling products over a communication network, a Payment Gateway (PG) company server and a mobile communication company server are operated in conjunction with each other, and which provides a service for electronic payments for a product requested to be purchased by a user from the affiliated store server. The method includes a purchase request verification step S100 of sequentially transmitting order request information of the product requested to be purchased by a user computer to the affiliated store server and the PG company server, and verifying the product and the relevant affiliated store on the basis of the order request information received at the PG company server.

At this step S100, the user enters order information about the relevant product using the user computer so as to purchase products posted on the portal site of the affiliated store at step S110. The affiliated store server transmits requested order information to the PG company server at step S120. Further, the PG company server verifies the affiliated store and the product for which a purchase order has been requested at step S130.

Next, the method includes the user primary authentication performance and secondary authentication preparation step S200 of sequentially transmitting information about a request for the primary authentication of the user, received from the user computer, to the affiliated store server, the PG company server and the mobile communication company server, allowing the mobile communication company server to primarily authenticate the user on the basis of the received primary authentication request information and send a response indicating whether the primary authentication of the user has been performed to the PG company server, allowing the PG company server, which verifies the primary authentication of the user through the mobile communication company server, to generate a One Time Password (OTP) for the secondary authentication of the user, and request the mobile communication company server to send a Short Message Service (SMS) message for the OTP so as to transmit the generated OTP to the mobile terminal of the user, and allowing the mobile communication company server to transmit the OTP generated by the PG company server to the mobile terminal of the user through an SMS message.

At this step S200, the user requests primary authentication from the affiliated store server using the user computer at step S205. In this case, items that must be entered by the user to request primary authentication may be the phone number and personal identification code of the user's own mobile terminal, that is, the user's mobile phone. The affiliated store server which receives the request for primary authentication transmits the phone number and personal identification code for primary authentication, received from the user computer, to the PG company server at step S210. Further, the PG company server requests the primary authentication of the user from the mobile communication company server at step S255.

In this case, between the above steps S210 and S255, the Limit Management System (LMS) capable of allowing the user to set his or her credit limit in advance and preventing the problem of nonpayment from occurring due to an excessive amount of funds being paid out so as to improve the convenience of transactions and a Risk Management System (RMS) capable of preventing unauthorized transactions by improper users so as to guarantee the security of transactions, may be used selectively or simultaneously.

First, referring to FIG. 2, methods of determining the limit of the user using the LMS will be described. When a request for primary authentication is received from the affiliated store server at step S210, the PG company server requests the LMS to determine the credit limit of the user for which primary authentication has been requested at step S215. The LMS determines the credit limit of the user in such a way as to manage the credit limit of the user based on the transaction details of the user, manage the credit limit of the user by establishing personal limit rules for respective clients, or manage basic credit limits of each user for respective mobile communication companies and to prohibit the payment of transactions exceeding the credit limit set by the user at step S220.

The step S220 of the LMS determining the credit limit of the user will be described. As shown in FIG. 5, after the limit management information of the user, such as a phone number, a personal identifier, a transaction amount and a parent/child relationship, has been received at step S221, the LMS determines using the limit management information whether an amount of money to be paid for the product requested to be ordered by the user exceeds the credit limit set by the user at step S222. If it is determined that the amount of money to be paid for the product exceeds the credit limit, the LMS denies the transaction by the user at step S224. In contrast, if it is determined that the amount of money to be paid for the product does not exceed the credit limit, the LMS permits the transaction by the user at step 223. In this case, in the respective cases where the transaction by the user is permitted and denied, the LMS collects and processes the transaction information of the user, including limit rules, an application period, an amount of money corresponding to a residual limit, an amount of money used, and limit setting details at step S225. The LMS generates and accumulates new information about the transaction details and residual limit of the user using the user's transaction information, collected and processed in this way, at step S226, and feeds the new information back to the previous step S222 as criteria for determination. Through the use of this method, the LMS determines the credit limit of the user.

Referring back to FIG. 2, when the credit limit of the user has been determined by the LMS at step S220, the LMS sends a response indicating whether the credit limit of the user has been determined to the PG company server at step S230.

Meanwhile, a method of verifying a normal transaction using a Risk Management system (RMS) will be described with reference to FIG. 3. The PG company server, having received a request for primary authentication from the affiliated store server at step S210, requests the RMS to verify whether the transaction by the user for which primary authentication has been requested is a normal transaction at step S235. The RMS functions to analyze the illegal payment patterns of users and prevent the occurrence of illegal payments. In detail, whether the transaction by the user is a normal transaction is verified by distinguishing a blacklist and a white list related to transactions from each other on the basis of the payment information of users and by prohibiting payments suspected to be for abnormal transactions and illegal payments in such a way as to deny a payment when a relevant user is registered on the blacklist and permit a payment when a relevant user is registered on the white list at step S240.

The step S240 of the risk management system verifying the normal transaction by the user will be described below. As shown in FIG. 6, after receiving risk management information including the Internet Protocol (IP) address, ID, email address, personal identifier, receipt information, and latest transaction information of the user computer at step S241, the RMS determines using the received risk management information whether the user is managed as an improper user or whether the IP address of the user computer is managed as an improper IP address at step S242. If it is determined that the user is managed as an improper user or that the IP address of the user computer is managed as an improper IP address, the RMS denies the transaction by the user at step S244. In contrast, it is determined that the user is not managed as an improper user or that the IP address of the user computer is not managed as an improper IP address, the RMS permits the transaction by the user at step S243. In the respective cases where the transaction by the user is permitted and denied, the RMS collects and processes the risk management application rules, illegal transaction data, and risk factor classification information of the user at step S245. The RMS analyzes the risk factors of the user, collected and processed in this way, and generates and accumulates new information related to rules at step S246, and then feeds the new information back to the previous step S242 as criteria for determination. Through the above process, the RMS verifies the normal transaction by the user.

Referring back to FIG. 3, when the normal transaction by the user has been verified by the RMS at step S240, the RMS sends a response indicating whether the normal transaction by the user has been verified to the PG company server at step S250.

In this case, as a preferred embodiment of the present invention, the above-described method of determining the credit limit of the user using the LMS and the method of verifying the normal transaction by the user using the RMS can be used together, as shown in FIG. 4.

After the determination of the credit limit of the user using the LMS or the verification of normal transaction using the RMS has been completed, the PG company server requests the primary authentication of the user from the mobile communication company server at step S255. The mobile communication company server primarily authenticates the requested user at step S260, and thereafter sends a response, indicating whether the primary authentication has been performed, to the PG company server at step S265. The PG company server having received the response indicating the primary authentication of the user generates a One Time Password (OTP) as an operation of preparing for the secondary authentication of the user at step S270. In order to transmit the OTP to the mobile terminal of the user through an SMS message, the PG company server requests the mobile communication company server to transmit the OTP at step S275. The mobile communication company server transmits the OTP generated by the PG company server to the mobile terminal of the user at step S280.

Next, the method of the present invention includes a user secondary authentication performance step S300 of inputting the OTP received through an SMS message to the user computer, transmitting the OTP to the PG company server, and then allowing the PG company server to secondarily authenticate the user using the OTP.

At this step S300, the user who receives the OTP generated by the PG company server through SMS transmits the OTP again to the PG company server using the user computer at step S310. The PG company server checks the OTP received from the user, thus secondarily authenticating the user at step S320.

Next, the method of the present invention provides a payment confirmation step S400 of, after the primary and secondary authentication of the user have been completed, allowing the affiliated store server to request the PG company server to confirm information about the payment for the purchase-requested product and the authentication of the user, and allowing the PG company server to confirm the information about the payment and authentication.

At this step S400, the affiliated store server requests the PG company server to confirm the information about the payment for the product purchase-requested by the user and the authentication of the user at step S410. The PG company server confirms the information about the payment for the product and the authentication of the user at step S420.

Next, the method of the present invention provides the step S500 of allowing the affiliated store server to request the PG company server to process the payment for the purchase-requested product, allowing the PG company server to request the mobile communication company server to process the payment, and allowing the mobile communication company server to process the requested payment and send determination of whether the payment has been successfully processed to the mobile terminal of the user through an SMS message.

At this step S500, the affiliated store server requests the PG company server to process the payment at step S510, and the PG company server requests the mobile communication company server to process the payment at step S520. The mobile communication company server processes and confirms the requested payment at step S530. The mobile communication company server notifies the mobile terminal of the user whether the payment by the mobile communication company server has been successfully processed, through an SMS message in response to an SMS sending request, received from the PG company server at step S540, at step S550.

In the above construction, preferred embodiments of a multi-step authentication-based electronic payment method using a mobile terminal according to the present invention have been described.

Accordingly, a multi-step authentication-based electronic payment method using a mobile terminal according to the present invention is advantageous in that it can achieve convenient electronic payments by utilizing the mobile terminal of a user, which has become popular, for making electronic payments, and can improve the security of making electronic payments by implementing the authentication of the user in multiple steps.

Furthermore, a multi-step authentication-based electronic payment method using a mobile terminal according to the present invention is advantageous in that it can improve the convenience of a user as well as the security of transactions by selectively or simultaneously utilizing a Limit Management System (LMS) capable of providing a payment service in line with the credit limit of the user and a Risk Management System (RMS) capable of preventing illegal transactions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Other and further embodiments utilizing one or more aspects of the inventions described above can be devised without departing from the spirit of Applicant's invention.

For example, the various methods and embodiments of the invention can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A multi-step authentication-based electronic payment method using a mobile terminal, an affiliated store server for selling products over a communication network, a Payment Gateway (PG) company server and a mobile communication company server, wherein the method comprises:
    (a) a purchase request verification step of
        sequentially transmitting order request information of a product requested to be purchased by a user computer to the affiliated store server and the PG company server, and
        verifying the product and a relevant affiliated store, based on the order request information received at the PG company server;
    (b) a user primary authentication performance and secondary authentication preparation step of
        sequentially transmitting information about a request for primary authentication of the user, received from the user computer, to the affiliated store server, the PG company server and the mobile communication company server,
        allowing the mobile communication company server to primarily authenticate the user, based on the primary authentication request information, and send a response indicating whether the primary authentication has been performed to the PG company server,
        allowing the PG company server, which verifies the primary authentication of the user through the mobile communication company server, to generate a One Time Password (OTP) for secondary authentication of the user and request the mobile communication company server to send a Short Message Service (SMS) message to transmit the generated OTP to the mobile terminal of the user, and
        allowing the mobile communication company server to transmit the OTP generated by the PG company server to the mobile terminal of the user through the SMS message;
    (c) a user secondary authentication step of
        inputting the OTP received through the SMS message to the user computer, and
        transmitting the OTP to the PG company server, thus allowing the PG company server to secondarily authenticate the user using the OTP;
    (d) a payment confirmation step of, after the primary and second authentication of the user have been completed,
        allowing the affiliated store server to request the PG company server to confirm information about a payment for the purchase-requested product and information about authentication of the user, and
        allowing the PG company server to confirm the information about the payment and authentication; and
    (e) a step of, after the payment confirmation step,
        allowing the affiliated store server to request the PG company server to process the payment for the purchase-requested product,
        allowing the PG company server to request the mobile communication company server to process the payment, and
        allowing the mobile communication company server to process the requested payment, and to transmit determination of whether the payment has successfully processed to the mobile terminal of the user through an SMS message.

2. The multi-step authentication-based electronic payment method according to claim 1, wherein step (b) comprises the steps of:
    (b-1) a limit determination request step of allowing the PG company server to request a Limit Management System (LMS) in which the user sets his or her credit limit in advance to determine the credit limit of the user;
    (b-2) a limit determination step of the LMS determining the credit limit of the user requested by the PG company server; and
    (b-3) after determining the credit limit of the user, the LMS transmitting results of the determination of the credit limit of the user to the PG company server.

3. The multi-step authentication-based electronic payment method according to claim 2, wherein step (b-2) comprises the steps of:
    (b-2-1) receiving limit management information of the user including a phone number, a personal identifier and a transaction amount;
    (b-2-2) determining using the received limit management information whether an amount of money to be paid for the product requested to be ordered by the user exceeds the credit limit set by the user;
    (b-2-3) if it is determined that the amount of money to be paid exceeds the credit limit, denying the transaction by the user, whereas if it is determined that the amount of money to be paid does not exceed the credit limit, permitting the transaction by the user; and
    (b-2-4) generating and accumulating new information about transaction details and residual limit of the user using collected transaction information of the user, which includes limit rules, an application period, an amount of money corresponding to the residual limit, an amount of money used, and limit setting details, and feeding the new information back to step (b-2-2) as criteria for determination.

4. The multi-step authentication-based electronic payment method according to claim 3, wherein the primary authentication request information at step (b) comprises a phone number and a personal identification code of the user.

5. The multi-step authentication-based electronic payment method according to claim 2, wherein the primary authentication request information at step (b) comprises a phone number and a personal identification code of the user.

6. The multi-step authentication-based electronic payment method according to claim 1, wherein step (b) comprises the steps of:
- (b-4) a normal transaction verification requesting step of the PG company server requesting a Risk Management System (RMS) to analyze illegal payment patterns, and requesting the RMS to verify whether the transaction by the user is a normal transaction;
- (b-5) a normal transaction verification step of the RMS verifying whether the transaction by the user is a normal transaction, as requested by the PG company server; and
- (b-6) after the RMS has verified whether the transaction by the user is a normal transaction, transmitting results of the verification of normal transaction by the user to the PG company server.

7. The multi-step authentication-based electronic payment method according to claim 6, wherein step (b-5) comprises the steps of:
- (b-5-1) receiving risk management information, which includes an Internet Protocol (IP) address, identification (ID), an email address, a personal identifier, receipt information, and latest transaction information of the user computer;
- (b-5-2) determining using the received risk management information whether the user is managed as an improper user, or whether the IP address of the user computer is managed as an improper IP address;
- (b-5-3) if it is determined that the user is managed as an improper user or that the IP address of the user computer is managed as an improper IP address, denying the transaction by the user, whereas if it is determined that the user is not managed as an improper user or that the IP address of the user computer is not managed as an improper IP address, permitting the transaction by the user; and
- (b-5-4) analyzing collected risk factors of the user, which includes risk management application rules, illegal transaction data, and risk factor classification information, generating and accumulating new information about rules, and feeding the new information back to step (b-5-2) as criteria for determination.

8. The multi-step authentication-based electronic payment method according to claim 7, wherein the primary authentication request information at step (b) comprises a phone number and a personal identification code of the user.

9. The multi-step authentication-based electronic payment method according to claim 6, wherein the primary authentication request information at step (b) comprises a phone number and a personal identification code of the user.

10. The multi-step authentication-based electronic payment method according to claim 1, wherein step (b) comprises the steps of:
- (b-1) a limit determination request step of allowing the PG company server to request a Limit Management System (LMS) in which the user sets his or her credit limit in advance to determine the credit limit of the user;
- (b-2) a limit determination step of the LMS determining the credit limit of the user requested by the PG company server;
- (b-3) after determining the credit limit of the user, the LMS transmitting results of the determination of the credit limit of the user to the PG company server;
- (b-4) a normal transaction verification requesting step of the PG company server requesting a Risk Management System (RMS) to analyze illegal payment patterns, and requesting the RMS to verify whether the transaction by the user is a normal transaction;
- (b-5) a normal transaction verification step of the RMS verifying whether the transaction by the user is a normal transaction, as requested by the PG company server; and
- (b-6) after the RMS has verified whether the transaction by the user is a normal transaction, transmitting results of the verification of normal transaction by the user to the PG company server.

11. The multi-step authentication-based electronic payment method according to claim 10, wherein:
step (b-2) comprises:
- (b-2-1) receiving limit management information of the user including a phone number, a personal identifier and a transaction amount;
- (b-2-2) determining using the received limit management information whether an amount of money to be paid for the product requested to be ordered by the user exceeds the credit limit set by the user;
- (b-2-3) if it is determined that the amount of money to be paid exceeds the credit limit, denying the transaction by the user, whereas if it is determined that the amount of money to be paid does not exceed the credit limit, permitting the transaction by the user; and
- (b-2-4) in respective cases where the transaction by the user is permitted and denied, generating and accumulating new information about transaction details and residual limit of the user using collected transaction information of the user, which includes limit rules, an application period, an amount of money corresponding to the residual limit, an amount of money used, and limit setting details, and feeding the new information back to step (b-2-2) as criteria for determination, and step (b-5) comprises the steps of:
- (b-5-1) receiving risk management information, which includes an Internet Protocol (IP) address, identification (ID), an email address, a personal identifier, receipt information, and latest transaction information of the user computer;
- (b-5-2) determining using the received risk management information whether the user is managed as an improper user, or whether the IP address of the user computer is managed as an improper IP address;
- (b-5-3) if it is determined that the user is managed as an improper user or that the IP address of the user computer is managed as an improper IP address, denying the transaction by the user, whereas if it is determined that the user is not managed as an improper user or that the IP address of the user computer is not managed as an improper IP address, permitting the transaction by the user; and
- (b-5-4) in respective cases where the transaction by the user is permitted and denied, analyzing collected risk factors of the user, which includes risk management application rules, illegal transaction data, and risk factor classification information, generating and accumulating new information about rules, and feeding the new information back to step (b-5-2) as criteria for determination.

12. The multi-step authentication-based electronic payment method according to claim 11, wherein the primary authentication request information at step (b) comprises a phone number and a personal identification code of the user.

13. The multi-step authentication-based electronic payment method according to claim 10, wherein the primary authentication request information at step (b) comprises a phone number and a personal identification code of the user.

14. The multi-step authentication-based electronic payment method according to claim 1, wherein the primary authentication request information at step (b) comprises a phone number and a personal identification code of the user.

15. A multi-step authentication-based electronic payment method using a mobile terminal, an affiliated store server for selling products over a communication network, a Payment Gateway (PG) company server and a mobile communication company server, wherein the method comprises:
(a) a purchase request verification step of
sequentially transmitting order request information of a product requested to be purchased by a user computer to the affiliated store server and the PG company server, and
verifying the product and a relevant affiliated store, based on the order request information received at the PG company server;
(b) a user primary authentication performance and secondary authentication preparation step of
sequentially transmitting information about a request for primary authentication of the user, received from the user computer, to the affiliated store server, the PG company server and the mobile communication company server,
primarily authenticating the user, at the mobile communication company server, based on the primary authentication request information, and
sending a response indicating whether the primary authentication has been performed from the mobile communication company server to the PG company server,
generating a One Time Password (OTP), at the PG company server, for secondary authentication of the user, the PG company server also requesting the mobile communication company server to send a Short Message Service (SMS) message containing the OTP to the mobile terminal of the user, and
transmitting the OTP from the mobile communication company server to the mobile terminal of the user through the SMS message;
(c) a user secondary authentication step of
inputting the OTP received through the SMS message to the user computer, and
transmitting the OTP to the PG company server, thus allowing the PG company server to secondarily authenticate the user using the OTP;
(d) a payment confirmation step of, after the primary and second authentication of the user have been completed, requesting the PG company server to confirm information about a payment for the purchase-requested product and information about authentication of the user, and the PG company server confirming the information about the payment and authentication; and
(e) a step of, after the payment confirmation step,
the affiliated store server requesting the PG company server to process the payment for the purchase-requested product,
the PG company server requesting the mobile communication company server to process the payment, and
the mobile communication company server processing the requested payment, and transmitting determination of whether the payment has successfully processed to the mobile terminal of the user through an SMS message.

16. The multi-step authentication-based electronic payment method according to claim 15, wherein step (b) comprises the steps of:
(b-1) the PG company server requesting a Limit Management System (LMS), in which the user sets his or her credit limit in advance, to determine the credit limit of the user;
(b-2) the LMS determining the credit limit of the user requested by the PG company server; and
(b-3) the LMS transmitting results of the determination of the credit limit of the user to the PG company server.

17. The multi-step authentication-based electronic payment method according to claim 16, wherein step (b-2) comprises the steps of:
(b-2-1) receiving limit management information of the user including a phone number, a personal identifier and a transaction amount;
(b-2-2) determining using the received limit management information whether an amount of money to be paid for the product requested to be ordered by the user exceeds the credit limit set by the user;
(b-2-3) if it is determined that the amount of money to be paid exceeds the credit limit, denying the transaction by the user, whereas if it is determined that the amount of money to be paid does not exceed the credit limit, permitting the transaction by the user; and
(b-2-4) generating and accumulating new information about transaction details and residual limit of the user using collected transaction information of the user, which includes limit rules, an application period, an amount of money corresponding to the residual limit, an amount of money used, and limit setting details, and feeding the new information back to step (b-2-2) as criteria for determination.

18. The multi-step authentication-based electronic payment method according to claim 15, wherein step (b) comprises the steps of:
(b-4) the PG company server requesting a Risk Management System (RMS) to analyze illegal payment patterns, and requesting the RMS to verify whether the transaction by the user is a normal transaction;
(b-5) the RMS verifying whether the transaction by the user is a normal transaction, as requested by the PG company server; and
(b-6) transmitting results of the verification of normal transaction by the user to the PG company server.

19. The multi-step authentication-based electronic payment method according to claim 18, wherein step (b-5) comprises the steps of:
(b-5-1) receiving risk management information, which includes an Internet Protocol (IP) address, identification (ID), an email address, a personal identifier, receipt information, and latest transaction information of the user computer;
(b-5-2) determining using the received risk management information whether the user is managed as an improper user, or whether the IP address of the user computer is managed as an improper IP address;
(b-5-3) if it is determined that the user is managed as an improper user or that the IP address of the user computer is managed as an improper IP address, denying the transaction by the user, whereas if it is determined that the user is not managed as an improper user or that the IP address of the user computer is not managed as an improper IP address, permitting the transaction by the user; and (b-5-4) analyzing collected risk factors of the user, which includes risk management application rules, illegal transaction data, and risk factor classification information, generating and accumulating new information about rules, and feeding the new information back to step (b-5-2) as criteria for determination.

20. The multi-step authentication-based electronic payment method according to claim 15, wherein step (b) comprises the steps of:
   (b-1) the PG company server requesting a Limit Management System (LMS) in which the user sets his or her credit limit in advance to determine the credit limit of the user;
   (b-2) the LMS determining the credit limit of the user requested by the PG company server;
   (b-3) the LMS transmitting results of the determination of the credit limit of the user to the PG company server;
   (b-4) the PG company server requesting a Risk Management System (RMS) to analyze illegal payment patterns, and requesting the RMS to verify whether the transaction by the user is a normal transaction;
   (b-5) the RMS verifying whether the transaction by the user is a normal transaction, as requested by the PG company server; and
   (b-6) transmitting results of the verification of normal transaction by the user to the PG company server.

21. The multi-step authentication-based electronic payment method according to claim 20, wherein:
   step (b-2) comprises:
      (b-2-1) receiving limit management information of the user including a phone number, a personal identifier and a transaction amount;
      (b-2-2) determining using the received limit management information whether an amount of money to be paid for the product requested to be ordered by the user exceeds the credit limit set by the user;
      (b-2-3) if it is determined that the amount of money to be paid exceeds the credit limit, denying the transaction by the user, whereas if it is determined that the amount of money to be paid does not exceed the credit limit, permitting the transaction by the user; and
      (b-2-4) generating and accumulating new information about transaction details and residual limit of the user using collected transaction information of the user, which includes limit rules, an application period, an amount of money corresponding to the residual limit, an amount of money used, and limit setting details, and feeding the new information back to step (b-2-2) as criteria for determination, and
   step (b-5) comprises the steps of:
      (b-5-1) receiving risk management information, which includes an Internet Protocol (IP) address, identification (ID), an email address, a personal identifier, receipt information, and latest transaction information of the user computer;
      (b-5-2) determining using the received risk management information whether the user is managed as an improper user, or whether the IP address of the user computer is managed as an improper IP address;
      (b-5-3) if it is determined that the user is managed as an improper user or that the IP address of the user computer is managed as an improper IP address, denying the transaction by the user, whereas if it is determined that the user is not managed as an improper user or that the IP address of the user computer is not managed as an improper IP address, permitting the transaction by the user; and
      (b-5-4) analyzing collected risk factors of the user, which includes risk management application rules, illegal transaction data, and risk factor classification information, generating and accumulating new information about rules, and feeding the new information back to step (b-5-2) as criteria for determination.

* * * * *